US010263559B2

(12) United States Patent
Matsuura et al.

(10) Patent No.: US 10,263,559 B2
(45) Date of Patent: Apr. 16, 2019

(54) SYNCHRONOUS MACHINE CONTROLLER

(71) Applicant: Mitsubishi Electric Corporation, Tokyo (JP)

(72) Inventors: Daiki Matsuura, Tokyo (JP); Noriyuki Wada, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/250,192

(22) Filed: Aug. 29, 2016

(65) Prior Publication Data
US 2017/0310265 A1 Oct. 26, 2017

(30) Foreign Application Priority Data

Apr. 22, 2016 (JP) ................. 2016-085777

(51) Int. Cl.
*H02H 7/08* (2006.01)
*H02P 6/16* (2016.01)
*H02K 11/21* (2016.01)
*H02K 11/27* (2016.01)
*H02P 27/08* (2006.01)
*H02P 29/024* (2016.01)

(52) U.S. Cl.
CPC ........... *H02P 27/08* (2013.01); *H02H 7/0805* (2013.01); *H02K 11/21* (2016.01); *H02K 11/27* (2016.01); *H02P 6/16* (2013.01); *H02P 29/027* (2013.01)

(58) Field of Classification Search
CPC .......... H02P 27/08; H02P 6/16; H02P 29/027; H02K 11/21; H02K 11/27; G01R 31/025; G01R 15/12
See application file for complete search history.

(56) References Cited

U.S. PATENT DOCUMENTS 5,309,075 A * 5/1994 Yokoe ..................... H02P 21/22
318/608
5,357,181 A 10/1994 Mutoh et al.
(Continued)

FOREIGN PATENT DOCUMENTS

JP 07177602 A 7/1995
JP 09182494 A * 7/1997
(Continued)

OTHER PUBLICATIONS

Communication dated Oct. 10, 2017 from the Japanese Patent Office in counterpart Japanese application No. 2016-085777.
(Continued)

*Primary Examiner* — Eduardo Colon Santana
*Assistant Examiner* — Said Bouziane
(74) *Attorney, Agent, or Firm* — Sughrue Mion, PLLC; Richard C. Turner

(57) ABSTRACT

When a failure of current detection parts occurs while a synchronous machine is operating, the failure of the current detection parts is detected and the operation of the synchronous machine is continued. An open-loop control part for performing control without using the detected current values of the current detection parts and a closed-loop control part for performing control using the detected current values are included, and a failure of the current detection parts is detected while the open-loop control part is operating.

7 Claims, 11 Drawing Sheets

(56) References Cited

U.S. PATENT DOCUMENTS

| | | | |
|---|---|---|---|
| 2006/0022626 A1* | 2/2006 | Kobayashi | B62D 5/046 318/432 |
| 2009/0133947 A1 | 5/2009 | Yoshihara et al. | |
| 2009/0189553 A1* | 7/2009 | Arnet | H02P 21/22 318/400.3 |
| 2009/0206818 A1* | 8/2009 | Horan | H02M 5/257 323/311 |
| 2010/0033122 A1* | 2/2010 | Hartman | H02P 29/0241 318/490 |
| 2013/0013154 A1* | 1/2013 | Aoki | B62D 5/046 701/42 |
| 2013/0107401 A1* | 5/2013 | Helt | H02H 7/09 361/33 |
| 2015/0365024 A1* | 12/2015 | Myoen | H02P 29/027 701/36 |
| 2016/0028335 A1* | 1/2016 | Dixon | H02P 23/03 318/432 |
| 2016/0218652 A1* | 7/2016 | Yamaguchi | G05B 13/02 |
| 2016/0276975 A1* | 9/2016 | Fujishima | H02P 29/685 |
| 2017/0033725 A1* | 2/2017 | Koseki | B62D 5/0484 |

FOREIGN PATENT DOCUMENTS

| | | |
|---|---|---|
| JP | 10313592 A | 11/1998 |
| JP | 2002-247858 A | 8/2002 |
| JP | 2006184160 A | 7/2006 |
| JP | 2007037274 A | 2/2007 |
| JP | 2009131043 A | 6/2009 |
| JP | 2016013040 A | 1/2016 |

OTHER PUBLICATIONS

Communication dated Jun. 20, 2017, from the Japanese Patent Office in counterpart application No. 2016-085777.

* cited by examiner

SYNCHRONOUS MACHINE CONTROLLER

BACKGROUND OF THE INVENTION

Field of the Invention

The present invention relates to a synchronous machine controller including a power conversion means for rotationally driving a synchronous machine.

Description of the Related Art

A synchronous machine controller controls a synchronous machine by detecting current flowing in the synchronous machine with a current detection part and feeding back the detected current value. If the current detection part fails and cannot detect current value accurately, the proper control becomes difficult.

However, if a failure of the current detection part can be detected, the proper control can be maintained by not using the faulty current detection part for the control.

As a method for detecting a failure of the current detection part, for example, as disclosed in JP-A-2002-247858 (PTL-1), a method of applying a voltage not causing a torque with a servo motor stopped and using the voltage and current at that time to detect a failure of a current sensor has been proposed.

[PTL 1] JP-A-2002-247858

The method of the PTL 1 is based on the precondition that the servo motor is stopped. So, as a problem, if a failure of the current detection part occurs when the servo motor is rotating, the failure cannot be detected properly.

SUMMARY OF THE INVENTION

In order to solve the above problem, it is an object of the present invention to provide a synchronous machine controller that, even when a current detection part fails while a synchronous machine is rotating, determines the failure of the current detection part and continues to control the synchronous machine.

The synchronous machine controller in accordance with the invention is a synchronous machine controller for converting a DC voltage to a PWM voltage and applying the PWM voltage to a synchronous machine, including: a variable voltage application part for applying a variable voltage and a variable frequency to the synchronous machine; a rotor position detection part for detecting a rotor position of the synchronous machine; current detection parts for detecting a current flowing in the synchronous machine and outputting the detected current value; an open-loop control part for performing control without using the detected current values; a closed-loop control part for performing control using the detected current values; a current detection part failure detection part for detecting a failure of the current detection parts from the detected current values; and a control switching part for switching between the open-loop control part and the closed-loop control part, wherein, when the control switching part switches to the open-loop control part, a failure of the current detection parts is detected.

According to the invention, even when a failure of the current detection parts occurs while the synchronous machine is rotating, the failure can be detected and the operation of the synchronous machine can be continued.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

A preferable embodiment of a synchronous machine controller in accordance with the invention is described below in detail with reference to the drawings.

First Embodiment

The configuration of a synchronous machine controller in accordance with a first embodiment, and the function of the components of the synchronous machine controller are described below.

Figure 1:
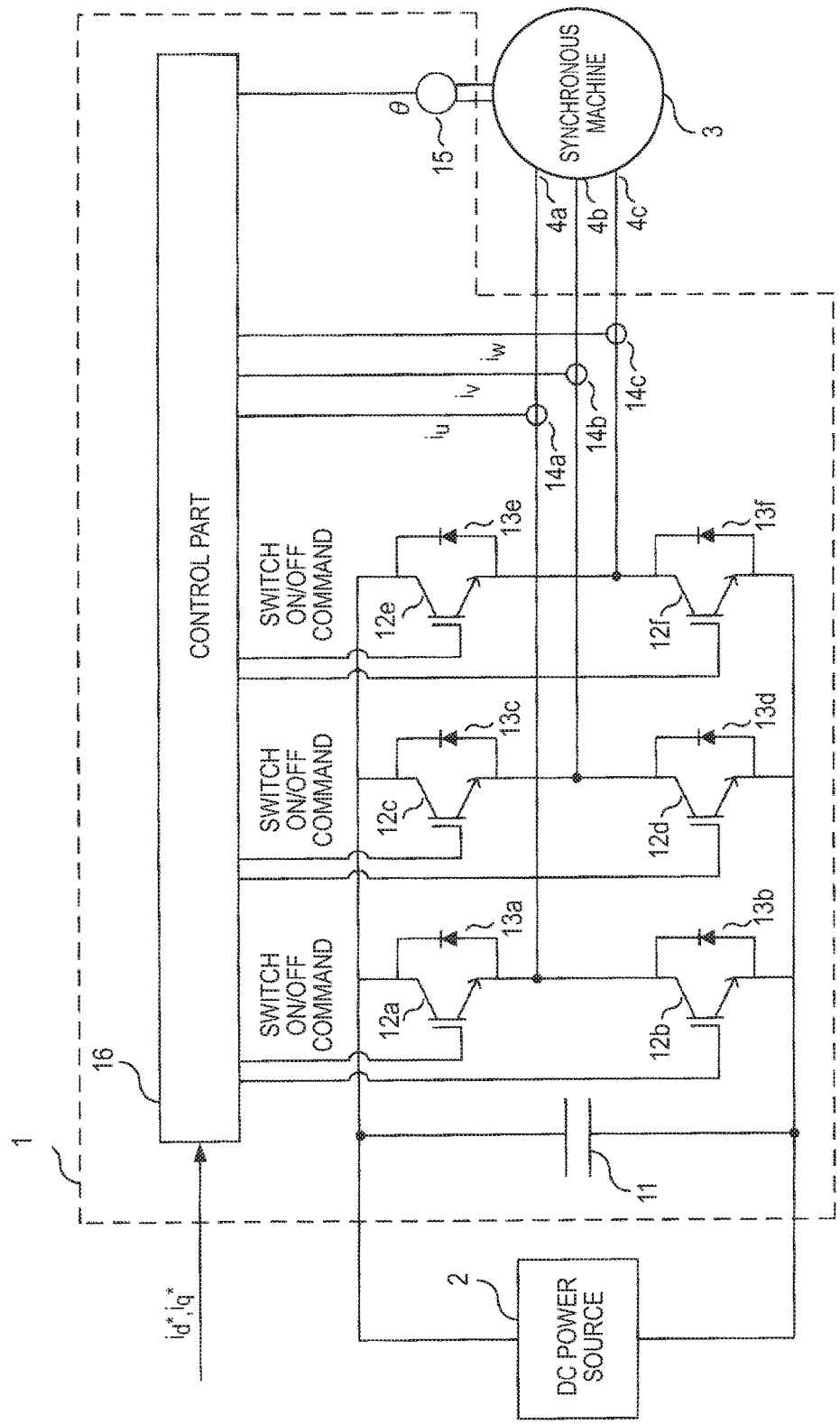
FIG. 1 shows a first embodiment of the invention, which is a configuration diagram showing an example of a synchronous machine control system including a synchronous machine controller, a power source, a synchronous machine and three phase lines.

FIG. 1 illustrates the first embodiment of the invention and shows a synchronous machine control system including a synchronous machine controller, a DC power source, a synchronous machine and three-phase lines. In FIG. 1, a synchronous machine controller 1, a DC power source 2 and a synchronous machine 3 are shown. The synchronous machine controller 1 controls the synchronous machine 3 based on the DC voltage of the DC power source 2. The synchronous machine controller 1 includes a capacitor 11, switching devices 12a, 12b, 12c, 12d, 12e, 12f, diodes 13a, 13b, 13c, 13d, 13e, 13f, current detection parts 14a, 14b, 14c, a rotor position detection part 15 and a control part 16. Note that the capacitor 11, the switching devices 12a, 12b, 12c, 12d, 12e, 12f, and the diodes 13a, 13b, 13c, 13d, 13e, 13f form a variable voltage application part.

The capacitor 11 suppresses variation in the DC voltage. The switching devices 12a, 12b, 12c, 12d, 12e, 12f allow current to flow when a switch ON command is issued by the control part 16, and prevent current from flowing when a switch OFF command is issued by the control part 16. The diodes 13a, 13b, 13c, 13d, 13e, 13f allow current to flow only in one direction (from bottom to top in FIG. 1). The current detection parts 14a, 14b, 14c detect uvw-phase currents and output the detected uvw-phase current values iu, iv, iw. The rotor position detection part 15 detects the rotor position θ of the synchronous machine 3. The control part 16 uses the detected uvw-phase current values iu, iv, iw and the rotor position θ to calculate the detected dq-axis current values id, iq, then issues switch ON/OFF commands so that the detected dq-axis current values id, iq follow commanded dq-axis current values id*, iq*, respectively.

Figure 2:
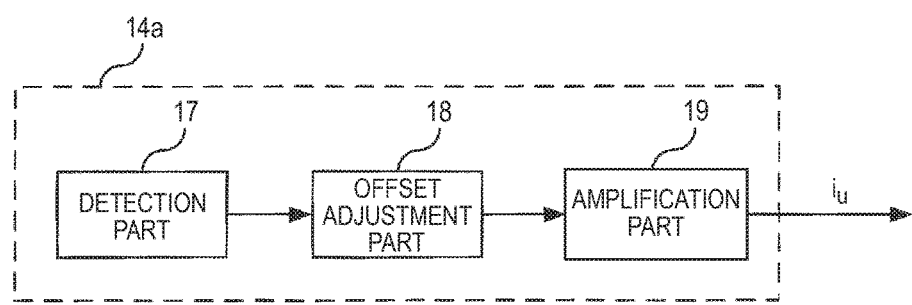
FIG. 2 shows the first embodiment of the invention, showing an example configuration of a current detection part.

FIG. 2 is one example configuration diagram of the current detection part 14a. In FIG. 2, the current detection part 14a includes a detection part 17, an offset adjustment part 18 and an amplification part 19. The current detection parts 14b, 14c have the same configuration as that of the current detection part 14a.

A failure of the current detection parts 14a, 14b, 14c may be as follows, for example. For example, when the detection part 17 fails and outputs the same value for any current flowing, a fixed value failure occurs (in which the detected current value becomes constant and does not vary). Or, for example, when the offset adjustment part 18 fails and the offset signal value deviates from an intended value, an offset failure occurs (in which the detected current value is given by a constant value added to an actual current value). Or, for example, when the amplification part 19 fails and the signal amplification gain deviates from an intended value, a gain failure occurs (in which the detected current value is given by an actual current value multiplied by a constant value).

Figure 3:
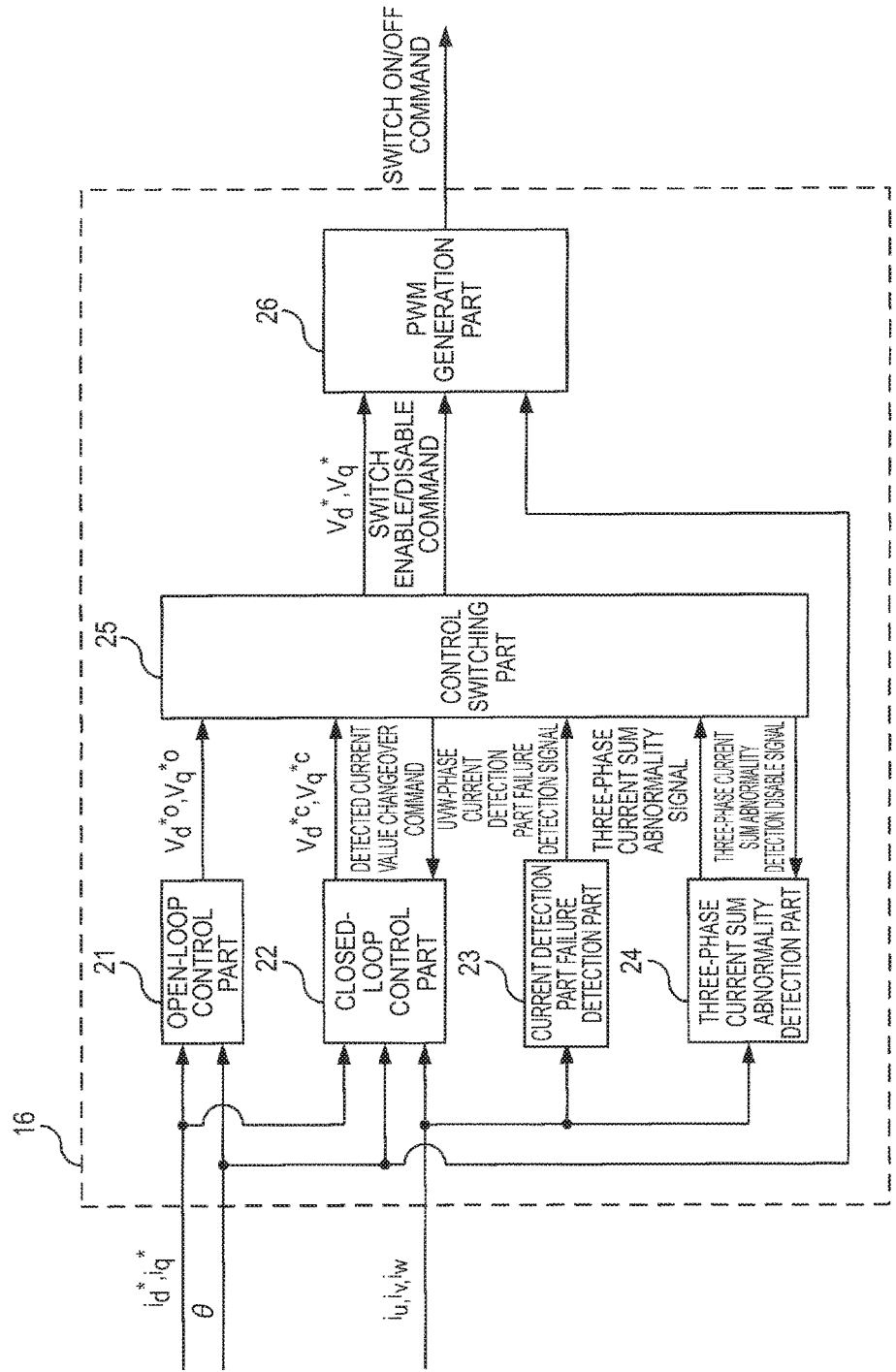
FIG. 3 shows the first embodiment of the invention, showing an example configuration of a control part.

FIG. 3 is one example configuration diagram of the control part 16. In FIG. 3, an open-loop control part 21 uses the commanded dq-axis current values id*, iq*, and the rotor position θ to calculate commanded open-loop dq-axis voltage values vd*$^o$, vq*$^o$.

Figure 4:
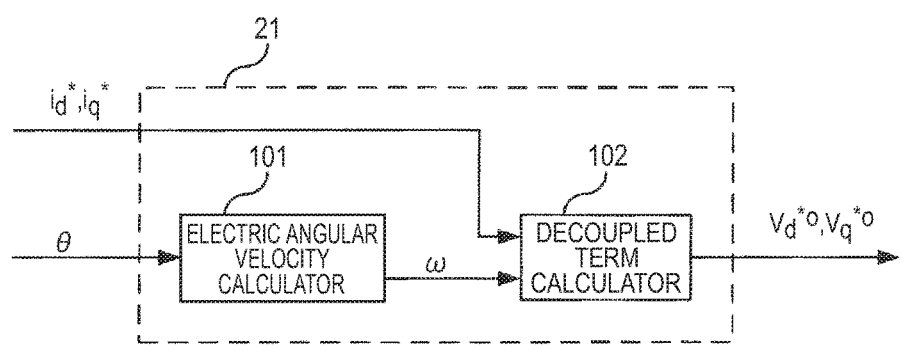
FIG. 4 shows the first embodiment of the invention, showing an example configuration of a open-loop control part.

FIG. 4 is one example configuration diagram of the open-loop control part 21. In FIG. 4, an electric angular velocity calculator 101 differentiates the rotor position θ to calculate an electric angular velocity ω. A decoupled term calculator 102 uses the commanded dq-axis current values id*, iq*, the electric angular velocity ω, a permanent magnet magnetic flux Φm of the synchronous machine 3 and dq-axis inductances Ld, Lq of the synchronous machine 3 to calculate the commanded open-loop dq-axis voltage values vd*$^o$, vq*$^o$ by calculation of the following equations (1).

$$\begin{cases} v_d^{*o} = -\omega L_q i_q^* \\ v_q^{*o} = \omega L_d i_d^* + \omega \Phi_m \end{cases} \quad (1)$$

In FIG. 3, a closed-loop control part 22 uses the commanded dq-axis current values id*, iq*, the detected uvw-phase current values iu, iv, iw, the rotor position θ and a detected current value changeover command from a control switching part 25 described later to calculate commanded closed-loop dq-axis voltage values vd*$^c$, vq*$^c$. Note that the detected current value changeover command is issued, when a current detection part fails, in order not to use a detected current value of the current detection part of the faulty phase, but to use the remaining two phases of current detection parts to perform control of the subsequent stages.

Figure 5:
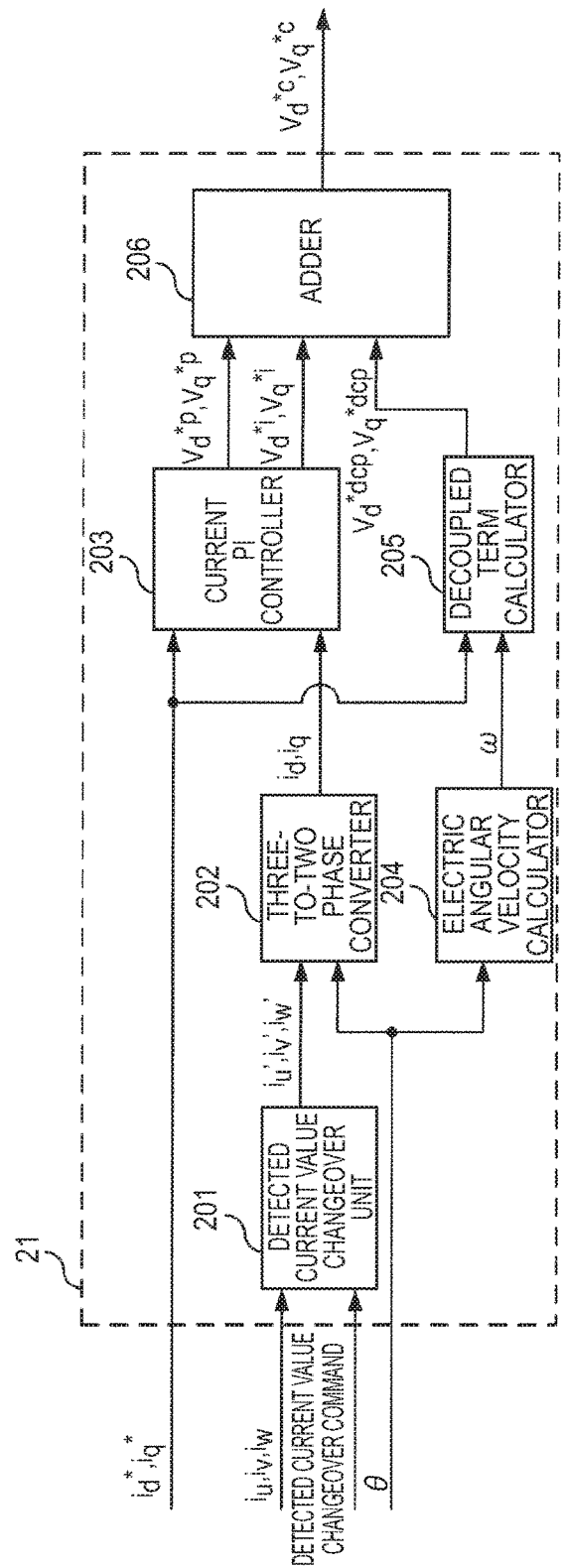
FIG. 5 shows the first embodiment of the invention, showing an example configuration of a closed-loop control part.

FIG. 5 is one example configuration diagram of the closed-loop control part 22. In FIG. 5, a detected current value changeover unit 201 uses the detected uvw-phase current values iu, iv, iw and the detected current value changeover command to calculate post-changeover detected uvw-phase current values iu', iv', iw'. The detected current value changeover is performed as follows. When the detected current value changeover command is "no changeover," the detected current value changeover is not performed, as shown by the following equations (2).

$$\begin{cases} i_u' = i_u \\ i_v' = i_v \\ i_w' = i_w \end{cases} \quad (2)$$

When the detected current value changeover command is "detected u-phase current value changeover," the detected u-phase current value changeover is performed, as shown by the following equations (3).

$$\begin{cases} i_u' = -i_v - i_w \\ i_v' = i_v \\ i_w' = i_w \end{cases} \quad (3)$$

When the detected current value changeover command is "detected v-phase current value changeover" or "detected w-phase current value changeover," the detected current value changeover is performed as with the "detected u-phase current value changeover."

A three-to-two phase converter 202 uses the post-changeover detected uvw-phase current values iu', iv', iw' and the rotor position θ to calculate dq-axis detected current values id, iq by calculation of the following equations (4).

$$\begin{pmatrix} i_d \\ i_q \end{pmatrix} = \sqrt{\frac{2}{3}} \begin{pmatrix} \cos\theta & \cos\left(\theta - \frac{2}{3}\pi\right) & \cos\left(\theta - \frac{4}{3}\pi\right) \\ -\sin\theta & -\sin\left(\theta - \frac{2}{3}\pi\right) & -\sin\left(\theta - \frac{4}{3}\pi\right) \end{pmatrix} \begin{pmatrix} i_u' \\ i_v' \\ i_w' \end{pmatrix} \quad (4)$$

Based on the difference between the commanded dq-axis current values id*, iq* and the detected dq-axis current values id, iq, a current PI controller 203 calculates dq-axis current control proportional terms vd*$^p$, vq*$^p$ and dq-axis current integration terms vd*$^i$, vq*$^i$ by calculation of the following equations (5) and (6).

$$\begin{cases} v_d^{*p} = K_{pd}(i_d^* - i_d) \\ v_q^{*p} = K_{pq}(i_q^* - i_q) \end{cases} \quad (5)$$

$$\begin{cases} v_d^{*i} = \frac{K_{id}}{s}(i_d^* - i_d) \\ v_q^{*i} = \frac{K_{iq}}{s}(i_q^* - i_q) \end{cases} \quad (6)$$

An electric angular velocity calculator 204 differentiates the rotor position θ to calculate an electric angular velocity ω. A decoupled term calculator 205 uses the commanded dq-axis current values id*, iq*, the electric angular velocity ω, the permanent magnet magnetic flux Φm of the synchronous machine 3 and the dq-axis inductances Ld, Lq of the synchronous machine 3 to calculate open-loop dq-axis decoupled terms vd*$^{dcp}$, vq*$^{dcp}$ by calculation of the following equations (7). An adder 206 uses the dq-axis current control proportional terms vd*$^p$, vq*$^p$, the dq-axis current integration terms vd*$^i$, vq*$^i$ and the dq-axis decoupled terms vd*$^{dcp}$, vq*$^{dcp}$ to calculate the commanded closed-loop dq-axis voltage values vd*$^o$, vq*$^o$ by the following equations (7).

$$\begin{cases} v_d^{*c} = v_d^{*p} + v_d^{*i} + v_d^{*dcp} \\ v_q^{*c} = v_q^{*p} + v_q^{*i} + v_q^{*dcp} \end{cases} \quad (7)$$

In FIG. 3, a current detection part failure detection part 23 uses the detected uvw-phase current values iu, iv, iw to determine for each of the uvw phases of the current detection parts 14a, 14b, 14c whether it is faulty or not, then outputs a failure detection signal for a phase in trouble.

Figure 6:
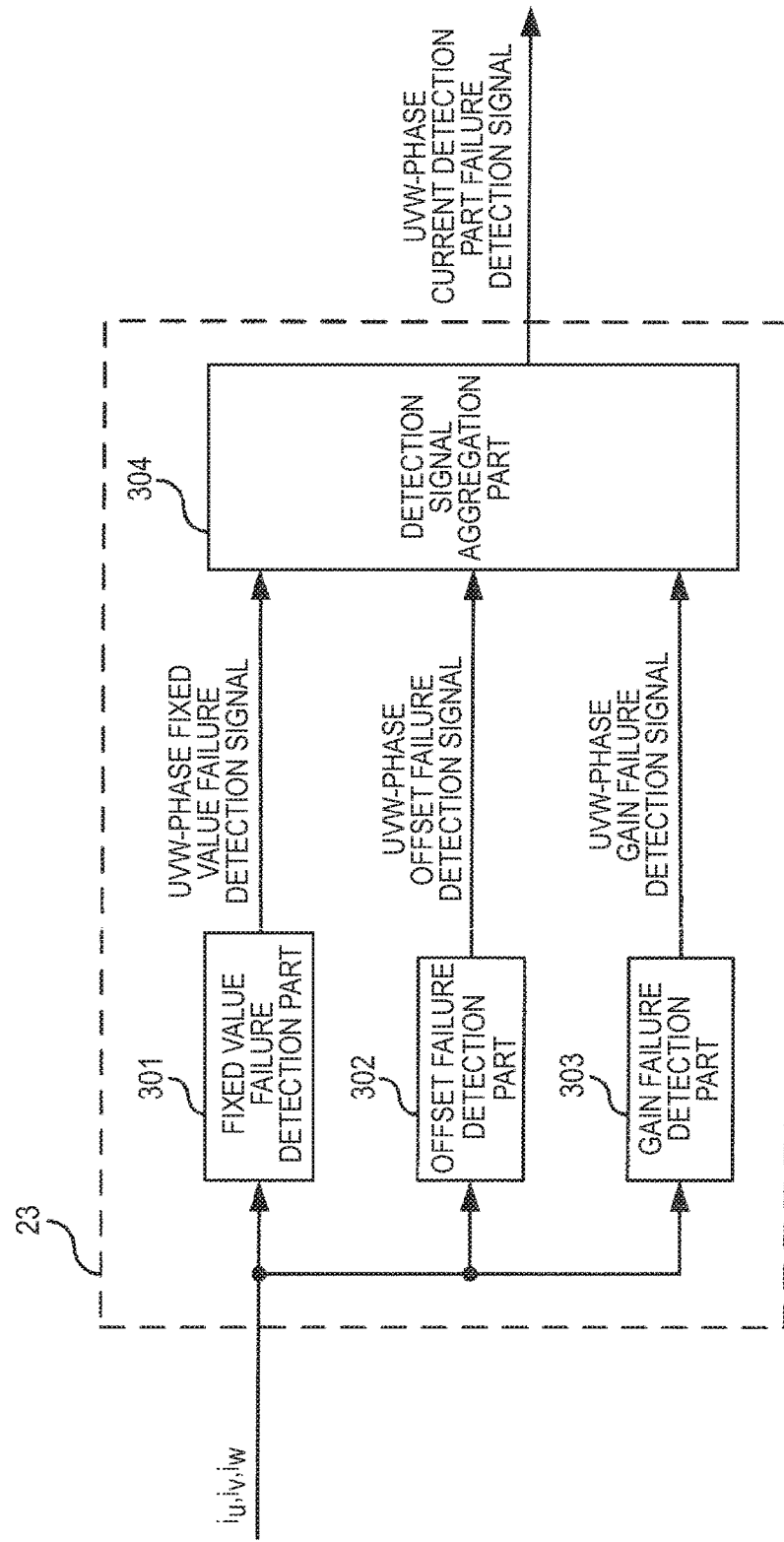
FIG. 6 shows the first embodiment of the invention, showing an example configuration of a current detection part failure detection part.

FIG. 6 is one example configuration diagram of the current detection part failure detection part 23. In FIG. 6, a fixed value failure detection part 301 uses the detected uvw-phase current values iu, iv, iw to detect a fixed value failure of the current detection parts 14a, 14b, 14c and output a uvw-phase fixed value failure detection signal.

The fixed value failure of the current detection parts 14a, 14b, 14c is detected as follows. For example, with a switch enable command having been issued by the control switching part 25, if the average value of the absolute value of a detected phase current value within a certain period of time (for example, longer than one cycle of the detected three-phase current value) is less than or equal to a threshold, it is determined that the current detection part of the corresponding phase is faulty. Or, for example, with a switch enable command having been issued, if the maximum value of the absolute value of a detected phase current value within a certain period of time is less than or equal to a threshold, it is determined that the current detection part of the corresponding phase is in the state of fixed value failure. Or, for example, with a switch enable command issued, if the percentage of the absolute value of a detected phase current value less than or equal to a threshold within a certain period of time is more than or equal to a predetermined value, it is determined that the current detection part of the corresponding phase is faulty. Or, for example, with a switch enable command having been issued, if the absolute value of the differential value of a detected phase current value within a certain period of time is less than or equal to a threshold, it is determined that the current detection part of the corresponding phase is faulty.

An offset failure detection part 302 uses the detected uvw-phase current values iu, iv, iw to detect an offset failure of the current detection parts 14a, 14b, 14c and output a uvw-phase offset failure detection signal.

The offset failure of the current detection parts 14a, 14b, 14c is determined as follows. For example, with a switch enable command having been issued, if the difference between the average value of the detected current value within a certain period of time of one phase and that of the other phases is more than or equal to a threshold, it is determined that the current detection part of the one phase is faulty.

A gain failure detection part 303 uses the detected uvw-phase current values iu, iv, iw to detect a gain failure of the current detection parts 14a, 14b, 14c and output a uvw-phase gain failure detection signal.

The gain failure of the current detection parts 14a, 14b, 14c is determined as follows. For example, with a switch enable command having been issued, if the difference between the maximum value of the detected current value within a certain period of time of one phase and that of the other phases is more than or equal to a threshold, it is determined that the current detection part of the one phase is faulty. Or, for example, with a switch enable command having been issued, if the difference between the minimum value of the detected current value within a certain period of time of one phase and that of the other phases is more than or equal to a threshold, it is determined that the current detection part of the one phase is faulty. Or, for example, with a switch enable command having been issued, if the difference between the difference value between the maximum value and the minimum value of the detected current value within a certain period of time of one phase and that of the other phases is more than or equal to a threshold, it is determined that the current detection part of the one phase is faulty. Or, for example, with a switch enable command having been issued, if the difference between the maximum value of the absolute value of the detected current value within a certain period of time of one phase and that of the other phases is more than or equal to a threshold, it is determined that the current detection part of the one phase is faulty.

A detection signal aggregation part 304 outputs a uvw-phase current detection part failure detection signal if any of the fixed value failure detection signal, the offset failure detection signal and the gain failure detection signal has been output for each of the uvw phases.

In FIG. 3, a three-phase current sum abnormality detection part 24 outputs a three-phase current sum abnormality signal when the sum of the detected uvw-phase current values iu, iv, iw is more than or equal to a threshold, and does not output the three-phase current sum abnormality signal when the sum is less than the threshold. Also, when the control switching part 25 has output a three-phase current sum abnormality detection disable signal, the three-phase current sum abnormality detection part 24 does not output the three-phase current sum abnormality signal irrespective of the value of the three-phase current sum.

The control switching part 25 selects one of the commanded open-loop dq-axis voltage values vd*$^o$, vq*$^o$ and the commanded closed-loop dq-axis voltage values vd*$^c$, vq*$^c$ according to a flowchart in FIG. 8 and described later, then outputs commanded dq-axis voltage values vd*, vq*. Also, the control switching part 25 outputs a switch enable/disable command according to the flowchart in FIG. 8.

Furthermore, the control switching part 25 outputs the detected current value changeover command based on the uvw-phase current detection part failure detection signal. When no failure-detected phase exists in the uvw-phase current detection part failure detection signal or when two or more failure-detected phases exist in the uvw-phase current detection part failure detection signal, the detected current value changeover command is "no changeover." When one failure-detected phase exists in the uvw-phase current detection part failure detection signal, the detected current value changeover command is "(failure-detected phase) changeover."

A PWM generation part 26 uses the commanded dq-axis voltage values vd*, vq*, the switch enable/disable command and the rotor position θ to output a switch ON/OFF command.

Figure 7:
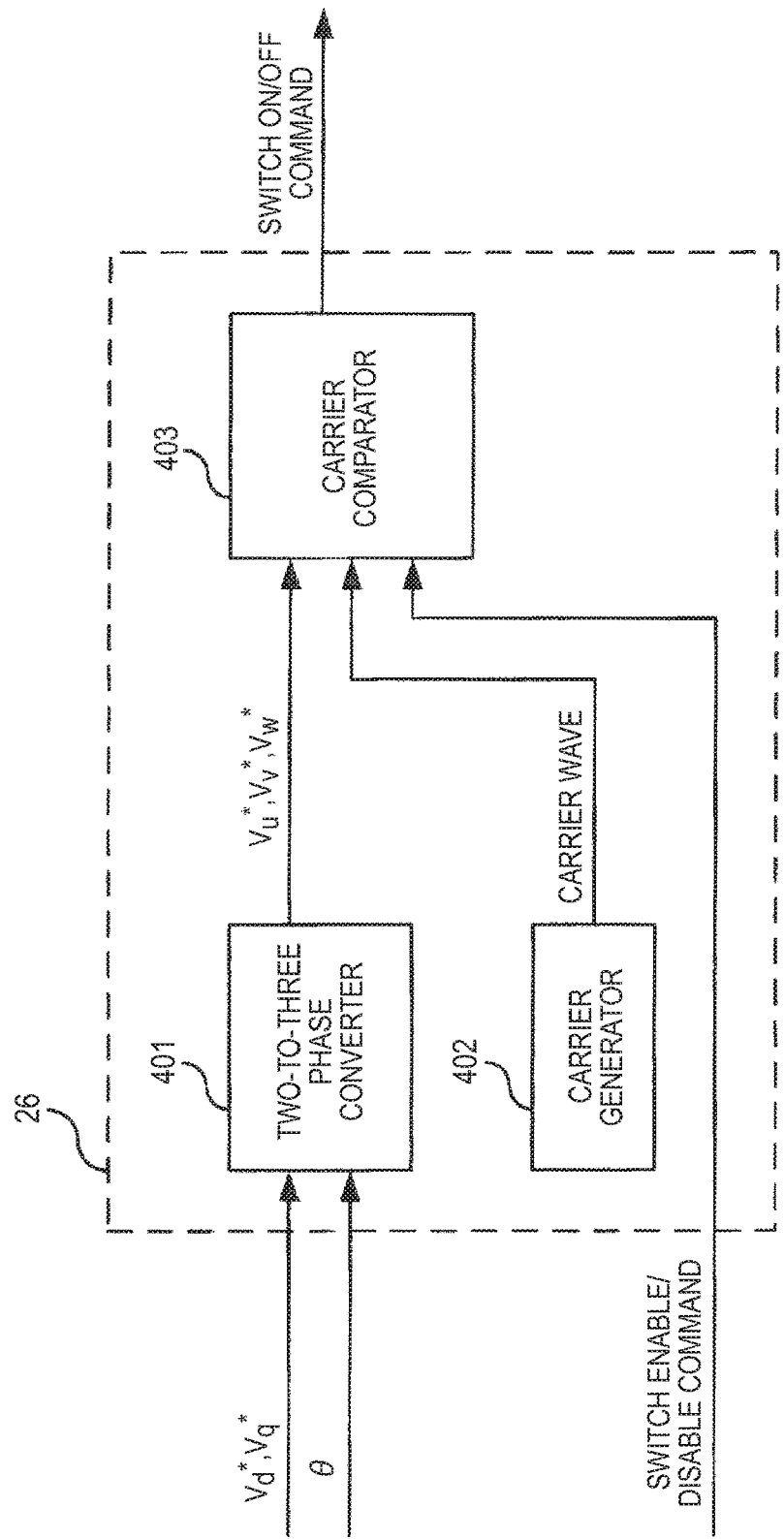
FIG. 7 shows the first embodiment of the invention, showing an example configuration of a PWM generation part.

FIG. 7 is a configuration diagram of the PWM generation part 26. In FIG. 7, a two-to-three phase converter 401 uses the commanded dq-axis voltage values vd*, q and the rotor position θ to calculate commanded uvw-phase voltage values vu*, vv*, vw* by calculation of the following equations (8).

$$\begin{pmatrix} v_u^* \\ v_v^* \\ v_w^* \end{pmatrix} = \sqrt{\frac{2}{3}} \begin{pmatrix} \cos\theta & -\sin\theta \\ \cos\left(\theta - \frac{2}{3}\pi\right) & -\sin\left(\theta - \frac{2}{3}\pi\right) \\ \cos\left(\theta - \frac{2}{4}\pi\right) & -\sin\left(\theta - \frac{2}{3}\pi\right) \end{pmatrix} \begin{pmatrix} v_d^* \\ v_q^* \end{pmatrix} \quad (8)$$

A carrier generator 402 generates carrier wave depending on a carrier cycle tc. With a switch enable command having been input, a carrier comparator 403 outputs a switch ON/OFF command based on the comparison between the carrier wave and the commanded uvw-phase voltage values vu*, vv*, vw*. With a switch disable command having been input, the carrier comparator 403 outputs a switch OFF command irrespective of the comparison between the carrier wave and the commanded uvw-phase voltage values vu*, vv*, vw*.

Figure 8:
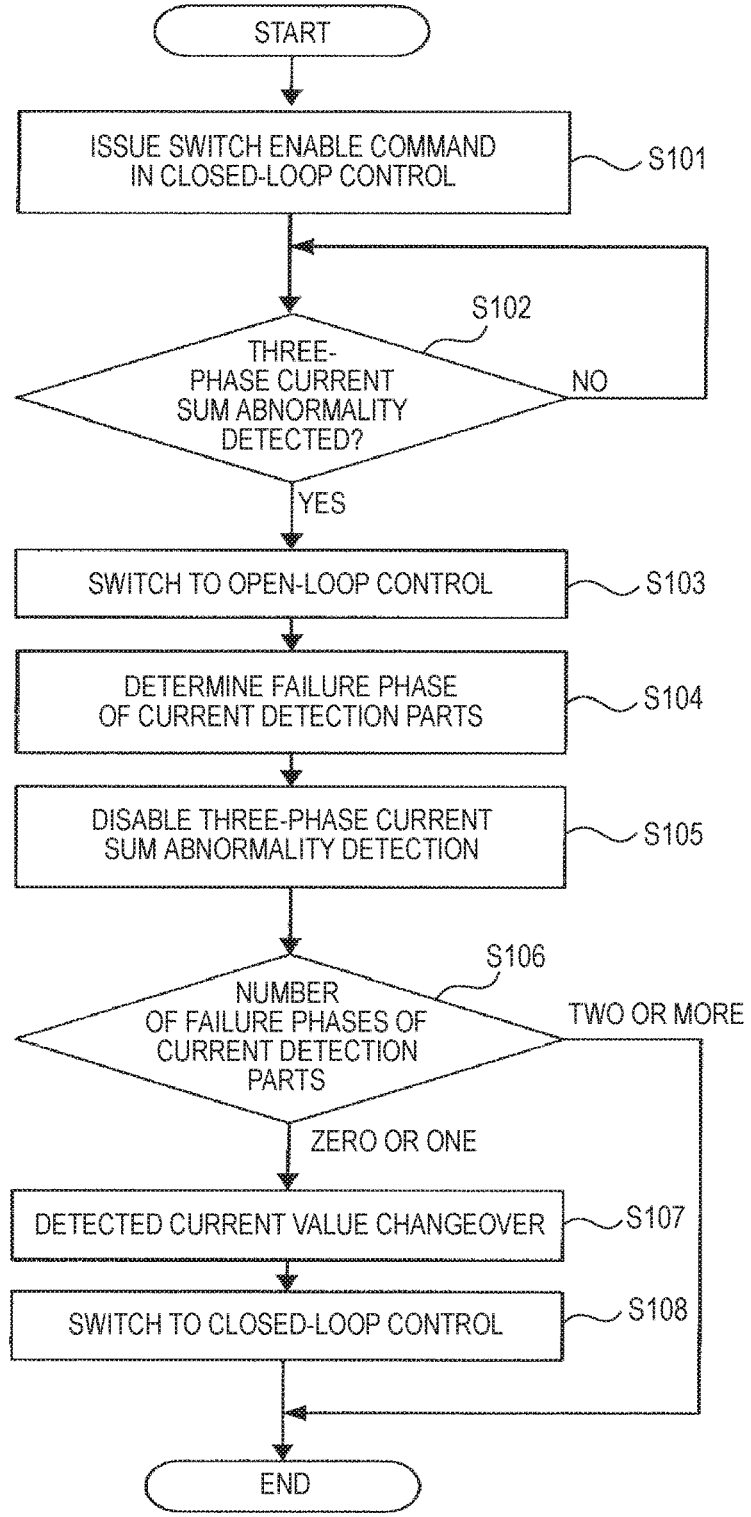
FIG. 8 shows the first embodiment of the invention, which is a flowchart showing the operation of a control switching part.

FIG. 8 is a flowchart showing the operation of the control switching part 25.

In FIG. 8, first, in step S101, the control switching part 25 outputs a switch enable command in a closed-loop control mode, then proceeds to step S102. In step S102, the control switching part 25 determines whether a three-phase current sum abnormality has been detected or not. If the three-phase current sum abnormality has been detected, the control switching part 25 proceeds to step S103. If the three-phase current sum abnormality has not been detected, the control switching part 25 proceeds to step S102.

In step S103, the control switching part 25 switches to an open-loop control mode, then proceeds to step S104. In step S104, the control switching part 25 determines a failure phase of the current detection parts 14a, 14b, 14c, then proceeds to step S105.

The gain failure (in which the detected current value is given by an actual current value multiplied by a constant value) and the offset failure (in which the detected current value is given by a constant value added to an actual current value) of the current detection parts 14a, 14b, 14c are determined as follows.

For example, with a switch enable command having been issued, if the difference between the maximum value of the detected current value within a certain period of time (for example, longer than one cycle of the detected three-phase current value) of one phase and that of the other phases is more than or equal to a threshold, it is determined that the current detection part of the one phase is faulty. Or, for example, if the difference between the minimum value of the detected current value within a certain period of time of one phase and that of the other phases is more than or equal to a threshold, it is determined that the current detection part of the one phase is faulty. Or, for example, if the difference between the difference value between the maximum value and the minimum value of the detected current value within a certain period of time of one phase and that of the other phases is more than or equal to a threshold, it is determined that the current detection part of the one phase is faulty. Or, for example, if the difference between the maximum value of the absolute value of the detected current value within a certain period of time of one phase and that of the other phases is more than or equal to a threshold, it is determined that the current detection part of the one phase is faulty. Or, for example, if the difference between the integrated value of the absolute value of the detected current value within a certain period of time of one phase and that of the other phases is more than or equal to a threshold, it is determined that the current detection part of the one phase is faulty.

The fixed value failure (in which the detected current value becomes constant and does not vary) of the current detection parts 14a, 14b, 14c are detected as follows.

For example, with a switch enable command having been issued, if the average value of the absolute value within a certain period of time is less than or equal to a threshold, it is determined that the current detection part of the corresponding phase is faulty. Or, for example, with a switch enable command having been issued, if the maximum value of the absolute value within a certain period of time is less than or equal to a threshold, it is determined that the current detection part of the corresponding phase is faulty. Or, for example, with a switch enable command issued, if the percentage of the absolute value less than or equal to a threshold within a certain period of time is more than or equal to a predetermined value, it is determined that the current detection part of the corresponding phase is faulty.

In step S105, the control switching part 25 disables the three-phase current sum abnormality detection, then proceeds to step S106. In step S106, if the number of failure phases of the current detection parts 14a, 14b, 14c is zero or one, the control switching part 25 proceeds to step S107. If the number of failure phases is two or more, the control switching part 25 continues the operation still in the open-loop control mode.

In step S107, the control switching part 25 performs the detected current value changeover for the failure-detected phase, then proceeds to step S108. In step S108, the control switching part 25 switches to a closed-loop control mode, then continues the operation in the closed-loop control mode.

With the synchronous machine 3 rotating, when a failure occurs in which the detected current value of one phase deviates from the actual current value (for example, the detected u-phase current value is given by the actual u-phase current value multiplied by 0.5, or the detected u-phase current value is given by the actual u-phase current value+ 100 A), the control operates such that the detected dq-axis current values follow the commanded dq-axis current values in the closed-loop control mode, which may make it impossible to detect a failure from the detected uvw-phase current values iu, iv, iw.

On the other hand, in the synchronous machine controller 1 in accordance with the first embodiment, when a deviation of the detected current value occurs as described above, a three-phase current sum abnormality is detected, which causes switching to the open-loop control mode (Yes in the step S102 of FIG. 8). In the open-loop control mode, switch enable/disable commands are generated without using the detected uvw-phase current values iu, iv, iw so that the maximum value of the absolute value within a certain period of time and the integrated value of the absolute value within a certain period of time will take almost the same value among the three phases for the actual uvw-phase current.

As a result, for the detected uvw-phase current values, the maximum value of the absolute value and the integrated value of the absolute value of a phase in which a failure occurs are different from those of the other two phases, which allows a failure to be detected (the step S104 of FIG. 8). If the number of failure phases of the current detection parts 14a, 14b, 14c is zero or one (Yes in the step S106 of FIG. 8), the control switching part 25 switches to the closed-loop control mode (the step S108 of FIG. 8), then the same control as that with no failure of the current detection parts 14a, 14b, 14c can be performed. Even if the number of failure phases of the current detection parts 14a, 14b, 14c is two or more (No in the step S106 of FIG. 8), the open-loop control mode is maintained, which allows the operation of the synchronous machine 3 to be continued.

Alternatively, if the number of failure phases of the current detection parts 14a, 14b, 14c is two or more (No in the step S106 of FIG. 8), a switch disable command may be issued to stop the operation of the synchronous machine 3, thereby improving safety.

As described above, even when a failure occurs in the current detection parts 14a, 14b, 14c while the synchronous machine 3 is rotating, the synchronous machine controller 1 in accordance with the first embodiment can determine a failure phase and continue the operation of the synchronous machine 3.

Second Embodiment

Next, a synchronous machine controller in accordance with a second embodiment of the invention is described.

When a failure occurs in which the detected current value of one phase of the current detection parts 14a, 14b, 14c is fixed to a value around 0 A, using the detected uvw-phase current values iu, iv, iw to cause the closed-loop control to operate may cause the absolute value of the detected uvw-phase current values to exceed a threshold (cause an overcurrent) in a short time (shorter than several microseconds) after a failure occurs in the current detection parts 14a, 14b, 14c.

If an overcurrent occurs, a switch disable command needs to be issued in order to protect the synchronous machine controller 1 and the synchronous machine 3. The time from the occurrence of the failure of the current detection parts 14a, 14b, 14c to the occurrence of the overcurrent is as short as less than several microseconds, so, the overcurrent may occur to cause switch OFF state before a three-phase current sum abnormality is detected. In switch OFF state, the detected current value of the three phases including the failure phase takes a value near 0 A. However, in switch OFF state, even when no failure occurs in the current detection parts 14a, 14b, 14c, the detected current value of the three phases takes a value near 0 A, so, whether or not a failure has occurred in the current detection parts 14a, 14b, 14c cannot be determined.

Accordingly, when a failure occurs in the current detection parts as described above in the synchronous machine controller 1 in accordance with the first embodiment, a failure of the current detection parts 14a, 14b, 14c cannot be determined, which may make it impossible to continue the operation of the synchronous machine 3.

However, an overcurrent may occur due to a failure other than a failure of the current detection parts 14a, 14b, 14c. For example, when a failure occurs in which a short-circuit occurs between the u-phase and the v-phase of three-phase lines 4a, 4b, 4c, the short-circuit may occur when the Hi-side of the u-phase and the Lo-side of the v-phase are switched ON at the same time (or when the Lo-side of the u-phase and the Hi-side of the v-phase are switched ON at the same time), causing an overcurrent. In order to detect a failure of the current detection parts 14a, 14b, 14c and continue the operation of the synchronous machine 3, the synchronous machine controller needs to determine whether or not the failure is due to the short-circuit in the three-phase lines, then, if the current detection part failure has occurred, continue the operation, or if the three-phase lines short-circuit failure has occurred, issue a switch disable command.

The synchronous machine controller in accordance with the second embodiment, when an overcurrent occurs, can discriminate the current detection part failure and the three-phase short-circuit failure, then, if the current detection part failure has occurred, continue the operation of the synchronous machine 3, or if the three-phase lines short-circuit failure has occurred, issue a switch disable command.

The synchronous machine controller of the second embodiment has almost the same configuration as that of the synchronous machine controller 1 of the first embodiment, but the configuration of the control part is partially different.

Figure 9:
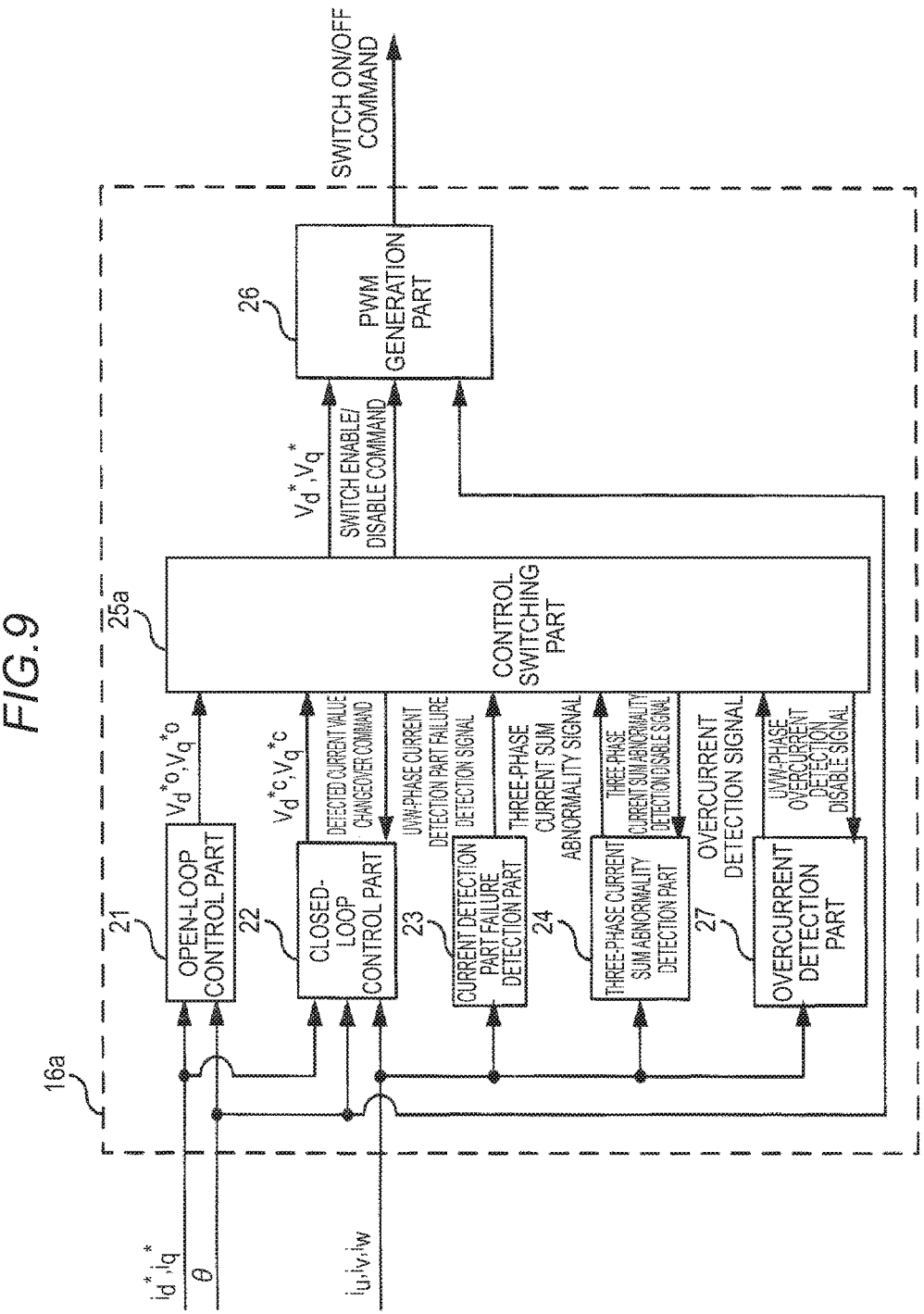
FIG. 9 shows a second embodiment of the invention, showing an example configuration of a control part.

FIG. 9 is one example configuration diagram of a control part 16a of the synchronous machine controller in accordance with the second embodiment. The configuration of the control part 16a of the synchronous machine controller in accordance with the second embodiment is almost the same as the control part 16 in accordance with the first embodiment except that an overcurrent detection part 27 is included and the input/output signals of a control switching part 25a are different from those of the control switching part 25. Note that the remaining part of the configuration is the same as that of the first embodiment and is denoted by the same reference numerals, and will not be repeatedly described, then, the difference from the control part 16 in accordance with the first embodiment is described below.

The overcurrent detection part 27 outputs an overcurrent detection signal when one or more of the absolute value of the uvw-phase detected current values iu, iv, iw are more than or equal to a threshold. However, the overcurrent detection will not be performed on a phase to which a uvw-phase overcurrent detection disable signal has been output.

In addition to the input signals of the control switching part 25 in the first embodiment, the overcurrent detection signal is input to the control switching part 25a. Also, in addition to the output signals of the control switching part 25, the control switching part 25a outputs the uvw-phase overcurrent detection disable signal.

Figure 10:
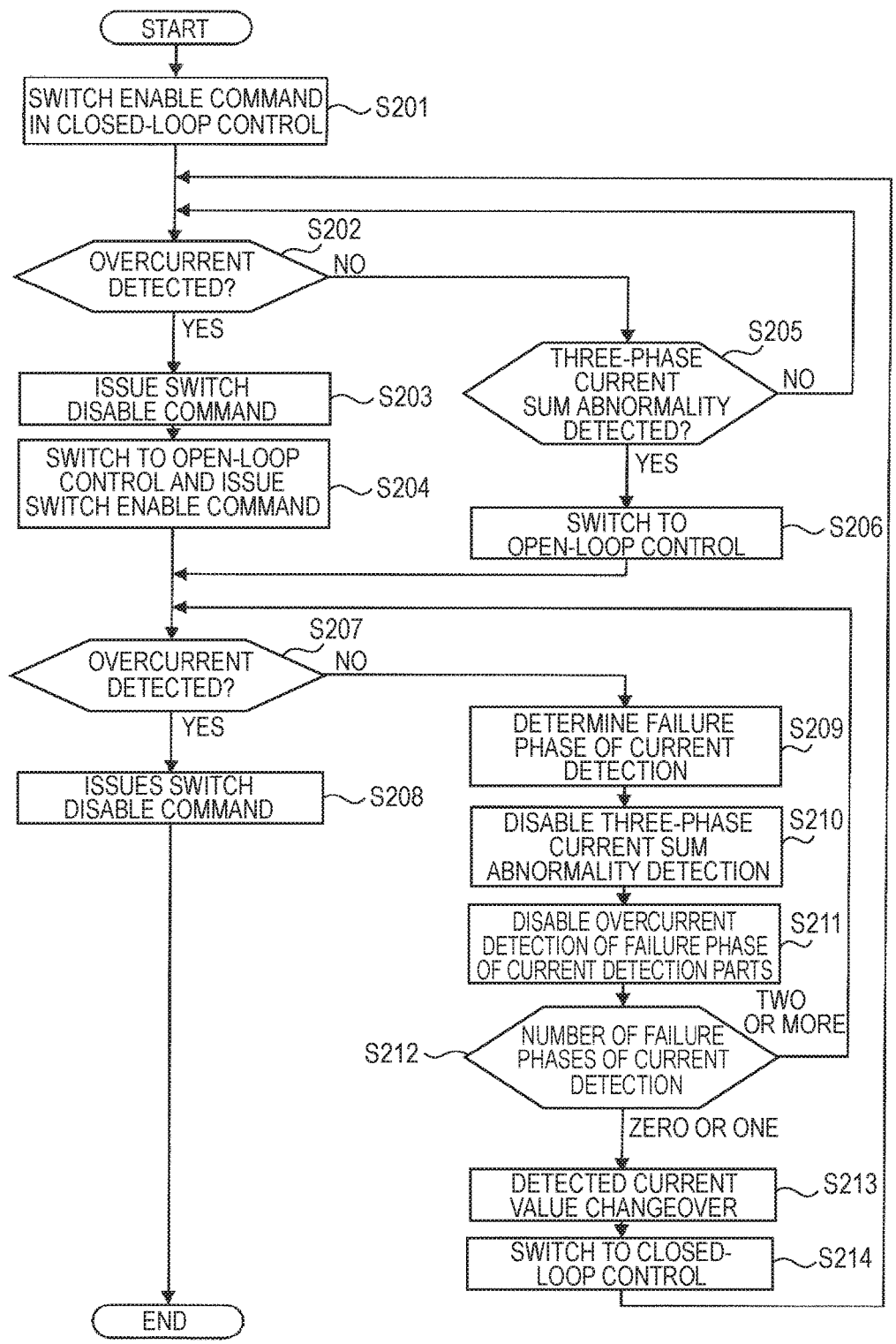
FIG. 10 shows the second embodiment of the invention, which is a flowchart showing the operation of a control switching part.

FIG. 10 is a flowchart showing the operation of the control switching part 25a in accordance with the second embodiment. In FIG. 10, first, in step S201, the control switching part 25a outputs a switch enable command in a closed-loop control mode, then proceeds to step S202.

In step S202, the control switching part 25a determines whether an overcurrent has been detected or not. If the overcurrent has been detected, the control switching part 25a proceeds to step S203. If the overcurrent has not been detected, the control switching part 25a proceeds to step S205.

In step S203, the control switching part 25a issues a switch disable command, then proceeds to step S204. In step S204, the control switching part 25a switches to an open-loop control mode and issues a switch enable command, then proceeds to step S207.

In step S205, the control switching part 25a determines whether a three-phase current sum abnormality has been detected or not. If the three-phase current sum abnormality has been detected, the control switching part 25a proceeds to step S206. If the three-phase current sum abnormality has not been detected, the control switching part 25a proceeds to step S202.

In step S206, the control switching part 25a switches to the open-loop control mode, then proceeds to step S207. In step S207, the control switching part 25a determines whether an overcurrent has been detected or not. If the overcurrent has been detected, the control switching part 25a proceeds to step S208. If the overcurrent has not been detected, the control switching part 25a proceeds to step S209.

In step S208, the control switching part 25a issues a switch disable command to continue the switch disabled state.

In step S209, the control switching part 25a determines a failure phase of the current detection parts 14a, 14b, 14c, then proceeds to step S210. A failure of the current detection parts 14a, 14b, 14c is determined in a way similar to the step S104 of the first embodiment.

In step S210, the control switching part 25a disables the three-phase current sum abnormality detection, then proceeds to step S211. In step S211, the control switching part 25a disables the overcurrent detection of the failure phase of the current detection parts, then proceeds to step S212.

In step S212, if the number of failure phases of the current detection parts 14a, 14b, 14c is zero or one, the control switching part 25a proceeds to step S213. If the number of failure phases is two or more, the control switching part 25a proceeds to step S207.

In step S213, the control switching part 25a performs the detected current value changeover for the failure-detected phase, then proceeds to step S214. In step S214, the control switching part 25a switches to the closed-loop control mode, then continues the operation in the closed-loop control mode from the step S202.

In the synchronous machine controller in accordance with the second embodiment, when a failure occurs in which the detected current value of one phase is fixed to around 0 A and an overcurrent occurs after the occurrence of the failure in the current detection parts 14a, 14b, 14c, the control switching part 25a switches to the open-loop control mode after issuing the switch disable command (the step S203 of FIG. 10), then issues the switch enable command (the step S204 of FIG. 10). In the open-loop control mode, the control is performed without using the uvw-phase detected current values, so, no overcurrent occurs (Yes in the step S207 of FIG. 10) and a failure phase of the current detection parts is determined (the step S209 of FIG. 10), then, if the number of failure phases is zero or one ("zero or one" in the step S212 of FIG. 10), the control switching part 25a switches to the closed-loop control mode (the step S214 of FIG. 10).

On the other hand, in the synchronous machine controller in accordance with the second embodiment, when a failure occurs in which a short-circuit occurs between the u-phase and the v-phase of the three-phase lines, an overcurrent occurs whether in the closed-loop control mode or in the open-loop control mode (Yes in the step S202, Yes in the step S207 of FIG. 10), then a switch disable command is issued (the step S208 of FIG. 10).

As described above, in the synchronous machine controller in accordance with the second embodiment, even when an overcurrent occurs due to a failure of the current detection parts 14a, 14b, 14c, the failure phase of the current detection parts 14a, 14b, 14c can be determined and the operation of the synchronous machine 3 can be continued. On the other hand, when an overcurrent occurs due to a cause other than a failure of the current detection parts 14a, 14b, 14c, the switch can be disabled to cause transition to a safe state.

Third Embodiment

Next, a synchronous machine controller in accordance with a third embodiment of the invention is described.

In the synchronous machine controller in accordance with the second embodiment, when, with the commanded dq-axis current values small, a failure occurs in the current detection parts 14a, 14b, 14c and the control switching part 25a switches to the open-loop control mode, the operation would be performed with the detected uvw-phase current values small, so, a failure of the current detection parts 14a, 14b, 14c may not be detected from the detected uvw-phase current values.

In the synchronous machine controller in accordance with the third embodiment, when the control switching part 25a switches to the open-loop control mode, the commanded dq-axis current values are specified so that the detected uvw-phase current values take a value large enough to enable the detection of a failure of the current detection parts 14a, 14b, 14c, which improves the accuracy of the detection of a failure of the current detection parts 14a, 14b, 14c.

The synchronous machine controller of the third embodiment has almost the same configuration as that of the synchronous machine controller of the second embodiment, but the configuration of the control part is partially different.

Figure 11:
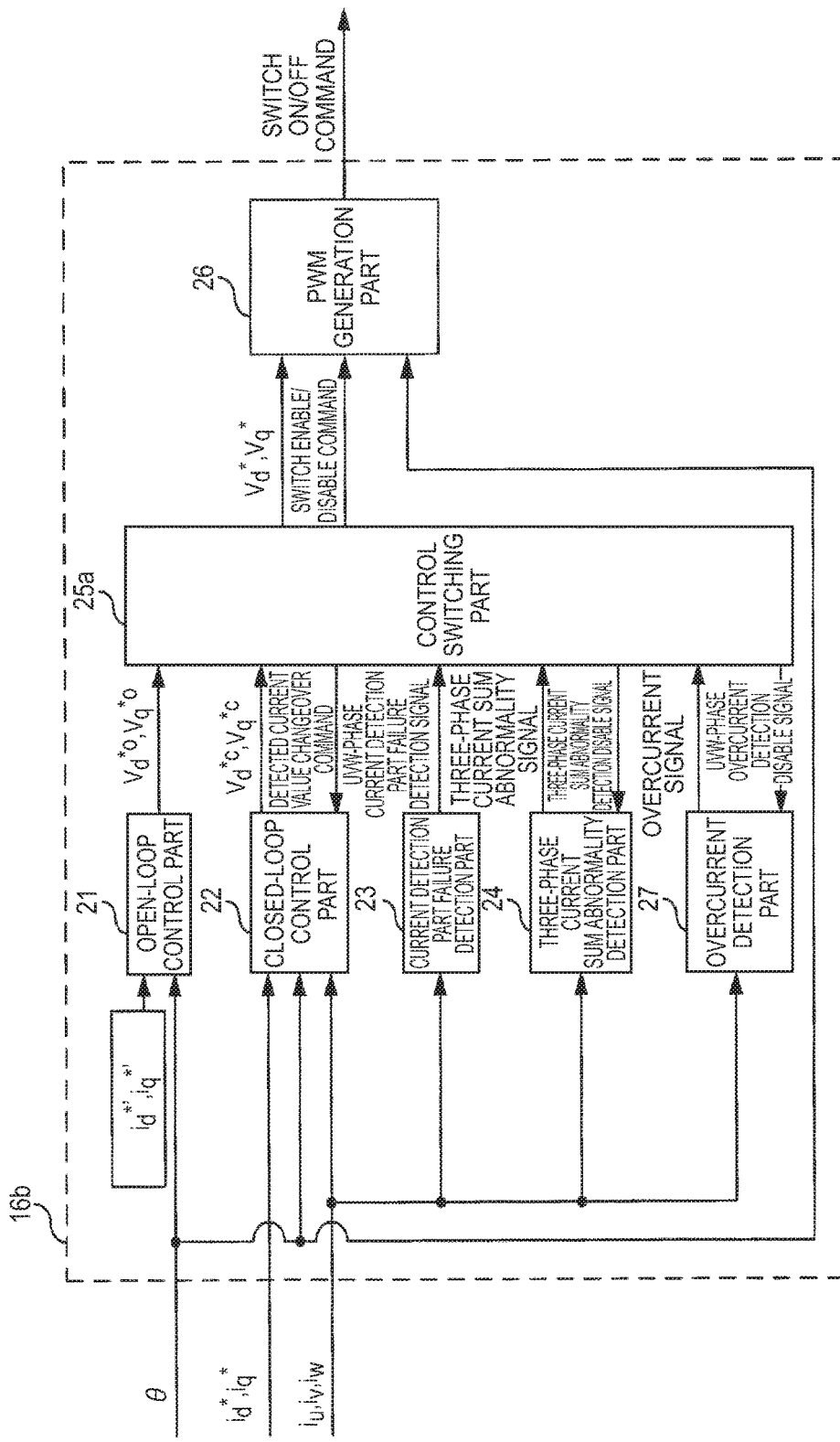
FIG. 11 shows a third embodiment of the invention, showing an example configuration of a control part.

FIG. 11 is one example configuration diagram of a control part 16b in accordance with the third embodiment. The configuration of the control part 16b in accordance with the third embodiment is almost the same as the control part 16a in accordance with the second embodiment except that commanded dq-axis current values id*', iq*' of the open-loop control part can be specified to be different from the commanded dq-axis current values id*, iq* of an external input.

The commanded q-axis current value of the open-loop control part is set to be, for example, iq*=0 so that no torque is generated in the open-loop control mode. The commanded dq-axis current values id*', iq*' of the open-loop control part are set to be, for example, id*=−Φm/Ld×α (α≥0), iq*=0 so that no torque is generated and the uvw-phase currents flow.

As described above, in the synchronous machine controller in accordance with the third embodiment, a failure of the current detection parts 14a, 14b, 14c is detected with the detected uvw-phase current values having been large to an extent in the open-loop control mode, which can improve the accuracy of the detection of a failure of the current detection parts 14a, 14b, 14c in comparison to the synchronous machine controller in accordance with the second embodiment.

Having described the first to third embodiments of the invention hereinbefore, according to the invention, the embodiments may be freely combined or the embodiments may be appropriately modified or omitted within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A synchronous machine controller for converting a DC voltage to a PWM voltage and applying the PWM voltage to a synchronous machine, comprising:
a variable voltage application part for applying a variable voltage and a variable frequency to the synchronous machine;
a rotor position detection part for detecting a rotor position of the synchronous machine;
current detection parts for detecting a current flowing in each phase of the synchronous machine and outputting the detected current values;

an open-loop control part for performing control without using the detected current values;

a closed-loop control part for performing control using the detected current values;

a current detection part failure detection part for detecting a failure of the current detection parts from the detected current values;

a control switching part for switching between the open-loop control part and the closed-loop control part; and an overcurrent detection part for determining an overcurrent when the absolute value of the detected current value of at least one phase of the detected current values is more than or equal to a threshold, wherein, when the overcurrent detection part detects an overcurrent, the control switching part switches to the open-loop control part, and wherein, if the overcurrent detection part does not detect an overcurrent when the control switching part has switched to the open-loop control part, the current detection part failure detection part detects the number of failure phases of the current detection parts, and then, if the number of failure phases is zero or one, the control switching part switches to the closed-loop control part; if the number of failure phases of the current detection parts is two or more, the control switching part continues the control with the open-loop control part; and if the overcurrent detection part detects an overcurrent, the variable voltage application part stops applying the voltage to the synchronous machine.

2. The synchronous machine controller according to claim 1, further comprising a current sum abnormality detection part for detecting a current sum abnormality when the sum of the detected current values is more than or equal to a threshold, wherein the control switching part switches to the open-loop control part when the current sum abnormality detection part detects a current sum abnormality.

3. The synchronous machine controller according to claim 1, wherein, if the number of failure phases of the current detection parts is two or more, the application of a voltage from the variable voltage application part to the synchronous machine is disabled.

4. The synchronous machine controller according to claim 1, wherein the current detection part failure detection part includes a fixed value failure detection part for detecting a fixed value failure in which the detected current value is fixed to a constant value, and wherein the fixed value failure detection part determines a fixed value failure based on a determination value calculated from the detected current value within a certain period of time.

5. The synchronous machine controller according to claim 1, wherein the current detection part failure detection part includes an offset failure detection part for detecting an offset failure in which the detected current value is given by a constant value added to an actual current value, wherein the offset failure detection part determines an offset failure based on a determination value calculated from the detected current value within a certain period of time.

6. The synchronous machine controller according to claim 1, wherein the current detection part failure detection part includes a gain failure detection part for detecting a gain failure in which the detected current value is given by an actual current value multiplied by a constant value, wherein the gain failure detection part determines a gain failure based on a determination value calculated from the detected current value within a certain period of time.

7. The synchronous machine controller according to claim 1, wherein the commanded current value is different between switching to the open-loop control part and switching to the closed-loop control part.

* * * * *